R. LINN.
RESILIENT WHEEL FOR VEHICLES.
APPLICATION FILED JULY 11, 1919.

1,421,508.

Patented July 4, 1922.
2 SHEETS—SHEET 1.

Witness:

Inventor,
Robert Linn,
By Glenn S. Noble, Atty.

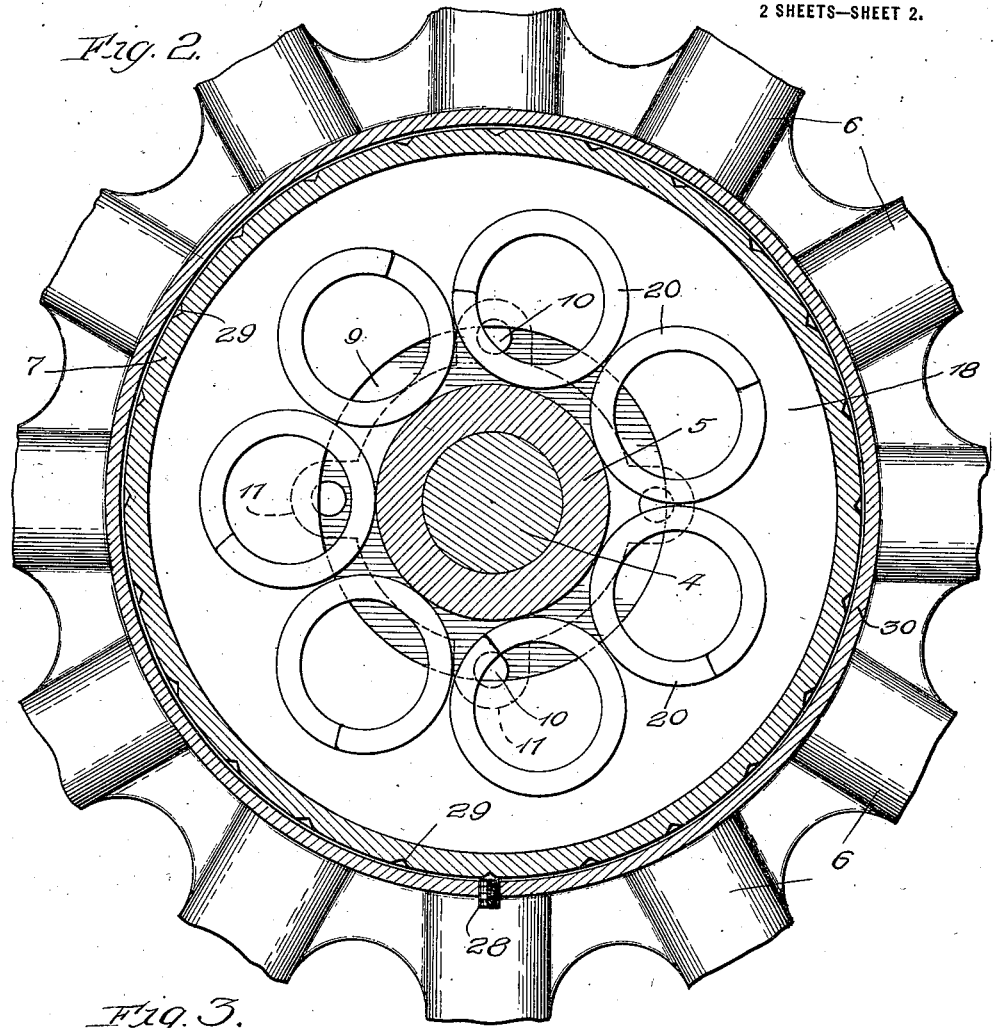

UNITED STATES PATENT OFFICE.

ROBERT LINN, OF CHICAGO, ILLINOIS.

RESILIENT WHEEL FOR VEHICLES.

1,421,508.     Specification of Letters Patent.     Patented July 4, 1922.

Application filed July 11, 1919. Serial No. 310,025.

*To all whom it may concern:*

Be it known that I, ROBERT LINN, a citizen of the United States, residing at Chicago, in the county of Cook and State of Illinois, have invented certain new and useful Improvements in Resilient Wheels for Vehicles, of which the following is a specification.

The desirability and necessity of taking up, or minimizing the jolts and jars of vehicles has been long understood, and it has been found that such necessity has increased greatly with the added speed of vehicles, particularly those run by motive power. It has also been found that it is desirable to have as little unsprung weight as possible in such vehicles as automobiles or the like. The present invention relates to an improved form of wheel, or of means cooperating with the wheel, whereby a resilient device is provided for taking up the jars and shocks.

The objects of the present invention are to provide an extremely efficient and durable resilient wheel for vehicles; to provide a wheel in which the resiliency is obtained by means of springs arranged circumferentially with respect to the axle; to provide a resilient wheel having means for adjusting the springs for different loads; and in general, to provide such an improved form of construction as will appear more fully from the following description.

In the accompanying drawings:

Fig. 2 is a sectional view taken on the line 2—2 of Fig. 1; and,

Fig. 3 is a detail showing the scale for indicating the adjustment.

Figure 1:
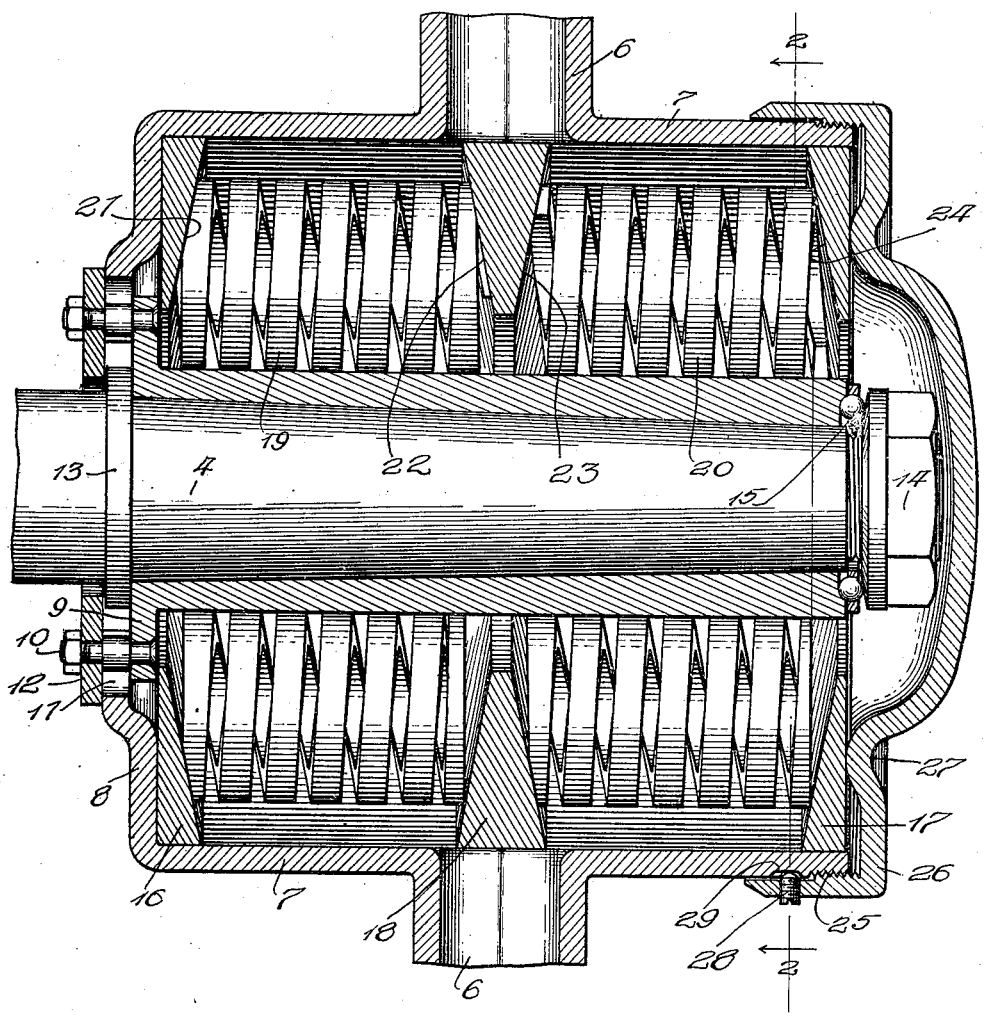
Fig. 1 is a longitudinal sectional view of the hub or central portion of a wheel embodying a preferred form of my invention.

The use of springs in connection with wheels has heretofore been proposed, but generally the springs have been arranged in such manner that they have not proven effective or durable. In accordance with this invention I utilize cylindrical compression springs in such manner that they will operate most effectively, and will also be durable.

In the form of my device illustrated in the accompanying drawings, 4 represents an axle or spindle having a sleeve or bearing 5 rotatably mounted thereon. While this sleeve is shown as applied directly to the spindle, it will be understood that any form of bearings, such as roller bearings or ball bearings, may be utilized, but such bearings form no part of this invention. The wheel 6 is provided with a hub 7 of substantially cylindrical form which is closed at the inner end by means of an integrally formed head or inwardly projecting flange 8. The hub 7 and the sleeve or bearing 5 must be connected so that they will rotate together, although having a certain amount of radial play. This connection is made by providing a flange 9 at the inner end of the sleeve 5 and extending bolts or studs 10 outwardly from this flange to engage with slots or recesses 11 in the inner periphery of the flange 8. The studs 10 also support a ring 12 which serves to cover the slots and also makes a substantially dust tight closure for the inner end of the hub. The bearing 5 engages with a flange or projection 13 on the axle 4 to prevent its movement longitudinally of the shaft, this flange or projection extending out between the flange 9 and ring 12. The sleeve or bearing 5 is prevented from moving longitudinally in the opposite direction by means of a nut 14 and ball bearing 15, as indicated in Fig. 1.

The hub 7 is provided at the ends with tapered rings 16 and 17, these rings being beveled or tapered on their inner or opposed faces in the manner indicated. A third ring 18 is arranged at approximately the center of the hub and is tapered or beveled on both faces in the manner indicated. All of these rings, or at least the rings 17 and 18, should be able to move somewhat freely in the hub or housing 7. Two sets of springs 19 and 20 are interposed between the bearing 5 and the beveled rings 16, 17, and 18. The springs 19 engage with the outer periphery of the bearing 5 and with the opposed faces 21 and 22 of the rings 16 and 18 respectively. The springs 20 also engage with the outer surface of the bearing 5 and with the opposed faces 23 and 24 of the rings 18 and 17 respectively, the rings serving as abutments for the ends of the springs. Sufficient clearance is provided between the beveled rings and the bearing 5 to permit the necessary relative movement of these parts.

Any suitable means may be provided for holding the rings and adjusting the tension on the springs. In the form shown, the end of the hub 7 is threaded at 25 to receive a correspondingly threaded cap 26. A portion of the cap 26, for instance, as indicated at 27, is bent inwardly to engage with the ring 17, and it will be seen that as the cap is screwed on, the ring 17 will be pressed in to increase the compression on the springs. A set screw 28 in the flange of the cap 26 is adapted to engage with recesses 29 in the outer periphery of the hub to hold the cap in adjusted position. The flange 30 of the cap 26 is provided with a scale or marks 31, and the hub is provided with a pointer 32, so that the pressure adjustment may be determined or indicated.

It will be seen that my improved device forms yielding support entirely around the axle, which will not only serve to lessen the jolts or jars delivered to the wheel when striking obstructions, but will also serve as shock absorbers to prevent the recoil or rebound of the vehicle. The axle and bearing are entirely suspended and supported in the series of springs, and the load on the bearing is supported by approximately all of the springs in the lower half of the hub or housing. The weight carried by the bearing 5 presses down on the upper longitudinal surface of the springs 19 and 20 which are beneath the same, and tend to crowd these springs down between the beveled rings and consequently to shorten the springs so that the load is sustained by the compressive action of the springs. The entire hub or housing is preferably filled with grease or lubricant so that all of these parts will work freely and without friction. If the wheel strikes an obstruction, the tendency is to force the wedge-shaped rings upwardly against the springs and this shock is distributed by the compression of the springs as the force is transmitted to the bearing or axle. As all of the springs are under more or less compression, the load will not be suddenly relieved, but will be taken up gradually by the upper springs. The compression may be adjusted to a desired point for a given load, and then if more weight is to be carried, as by the addition of one or more passengers, the operator may turn the cap 26 to increase the compression for such additional load.

It will be observed that for short hubs the inner ring might be omitted, but this ring is desirable for long hubs, as the springs may be made comparatively short and will, therefore, not be apt to buckle, and, furthermore, a large number of springs tends to give more effective cushioning action.

It will be noted that various changes may be made in the details of construction, so that the principle disclosed herein may be utilized for different forms of wheels and, therefore, I do not wish to limit myself to the exact construction herein shown and described, except as pointed out in the following claims, in which I claim:

1. A resilient wheel for vehicles having coiled compression springs engaging longitudinally with the axle, and having means for transmitting the load from the axle longitudinally through said springs to the outer portions of the wheel.

2. In a resilient wheel, the combination of a bearing, radially arranged coiled springs engaging longitudinally with the bearing, a hub, and means for transmitting the load from the springs to said hub.

3. In a wheel, the combination of a bearing, a series of springs arranged radially around the bearing and engaging therewith longitudinally, a hub, and rings in said hub having tapered faces for engagement with the ends of the springs whereby the load will be transmitted through the springs and rings to the hub.

4. In a wheel, the combination of a sleeve or bearing for engagement with an axle, a hub, and compression springs arranged radially around the sleeve and engaging longitudinally therewith and coacting with beveled rings tending to hold the sleeve centrally with respect to the hub.

5. In a wheel, the combination of a bearing, a plurality of compression springs engaging longitudinally with the bearing, a hub, and abutments in the hub engaging with the ends of the springs for transmitting the pressure on the springs to the hub.

6. The combination of a bearing, a plurality of cylindrical compression springs arranged longitudinally of the bearing and engaging tangentially therewith, a cylindrical hub spaced from said springs, and rings fitting in said hub, said rings having tapered faces for engagement with the ends of said springs.

7. In a wheel, the combination of a bearing, a housing, means for connecting the housing with the bearing to allow radial movement of the housing, rings in the ends of said housing having beveled opposed faces, a central ring in said housing having beveled faces, a plurality of cylindrical springs interposed between the bearing and the respective rings, and means for adjusting said rings to regulate the compression on the springs.

8. In a wheel, the combination of a sleeve having a flange at one end thereof, a housing spaced from said sleeve and having a flange at one end thereof engaging with said first-named flange, a ring arranged adjacent to the last-named flange, studs connecting said first-named flange and said ring, and engaging with slots in the second-named flange, rings fitting in said housing and having opposed beveled faces, said rings being spaced away from the sleeve, cylindrical compression springs engaging with said sleeve and having their ends abutting against said rings, a threaded cap for said housing, said cap engaging with one of said rings to move the same longitudinally of the housing, and means for locking said cap in adjusted position.

ROBERT LINN.